(12) United States Patent
Falconetti

(10) Patent No.: US 11,438,848 B2
(45) Date of Patent: Sep. 6, 2022

(54) UPLINK CONTROL CHANNEL POWER CONTROL ADJUSTMENT IN A NETWORK WITH DIFFERENT PROCESSING TIMES

(71) Applicant: Telefonaktiebolaget LM Ericsson (publ), Stockholm (SE)

(72) Inventor: Laetitia Falconetti, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 29 days.

(21) Appl. No.: 16/969,280

(22) PCT Filed: Nov. 1, 2018

(86) PCT No.: PCT/IB2018/058569
§ 371 (c)(1),
(2) Date: Aug. 12, 2020

(87) PCT Pub. No.: WO2019/158987
PCT Pub. Date: Aug. 22, 2019

(65) Prior Publication Data
US 2021/0007058 A1    Jan. 7, 2021

Related U.S. Application Data

(60) Provisional application No. 62/710,390, filed on Feb. 16, 2018.

(51) Int. Cl.
*H04W 52/32* (2009.01)
*H04W 52/22* (2009.01)
(Continued)

(52) U.S. Cl.
CPC ............ *H04W 52/221* (2013.01); *H04L 5/14* (2013.01); *H04W 52/08* (2013.01); *H04W 52/146* (2013.01); *H04W 72/042* (2013.01)

(58) Field of Classification Search
CPC ........... H04W 72/0446; H04W 52/146; H04W 48/12; H04W 52/0235; H04W 52/04;
(Continued)

(56) References Cited

U.S. PATENT DOCUMENTS

| | | | |
|---|---|---|---|
| 2011/0038271 A1 | 2/2011 | Shin et al. | |
| 2013/0114562 A1* | 5/2013 | Seo ........................ | H04W 52/16 370/329 |
| 2014/0029532 A1* | 1/2014 | Han ....................... | H04W 16/18 370/329 |

OTHER PUBLICATIONS

3GPP TS 36.213 v15.0.0; Technical Specification; 3rd Generation Partnership Project; Technical Specification Group Radio Access Network; Evolved Universal Terrestrial Radio Access (E-UTRA); Physical layer procedures (Release 15)—Dec. 2017.
3GPP TSG RAN WG1 Meeting #89; Hangzhou, P.R. China; Source: NTT Docomo, Inc.; Title: Uplink power control for sTTI (R1-1708423)—May 15-19, 2017.
3GPP TSG RAN WG1 Meeting #90bis; Prague, Czech Republic; Source: LG Electronics; Title: Discussion on power control for sPUSCH (R1-1717258)—Oct. 9-13, 2017.
(Continued)

Primary Examiner — Tu X Nguyen
(74) Attorney, Agent, or Firm — Baker Botts, LLP

(57) ABSTRACT

Systems and methods are provided herein for uplink (UL) control channel power control adjustment. In some embodiments a method performed by a wireless device for controlling power for an UL control channel includes receiving a first transmit power control (TPC) command; receiving at least a second TPC command; computing a power for the UL control channel transmission based on at least the first TPC command and the second TPC command; and adjusting a power for the UL control channel according to the computed power. In this way, the wireless device behavior is clarified in terms of UL power setting in case multiple transmissions with feedback in the same UL transmission are scheduled, especially if these multiple transmissions are scheduled at different times.

18 Claims, 14 Drawing Sheets

(51) Int. Cl.
   *H04L 5/14*   (2006.01)
   *H04W 52/08*  (2009.01)
   *H04W 52/14*  (2009.01)
   *H04W 72/04*  (2009.01)

(58) Field of Classification Search
   CPC ............. H04W 52/143; H04W 52/228; H04W 52/242; H04W 52/325; H04W 52/34; H04W 52/32; H04W 52/08; H04W 52/54; H04W 52/58; H04W 52/38; H04W 52/18; H04L 1/1614
   See application file for complete search history.

(56) References Cited

OTHER PUBLICATIONS

3GPP TSG-RAN WG1 Meeting #92; Athens, Greece; Source: Ericsson; Title: Text proposal on closed loop power control for SPUCCH (R1-1802966)—Feb. 26-Mar. 2, 2018.

PCT International Search Report for International application No. PCT/IB2018/058569—dated Dec. 21, 2018.

PCT Written Opinion of the International Searching Authority for International application No. PCT/IB2018/058569—dated Dec. 21, 2018.

* cited by examiner

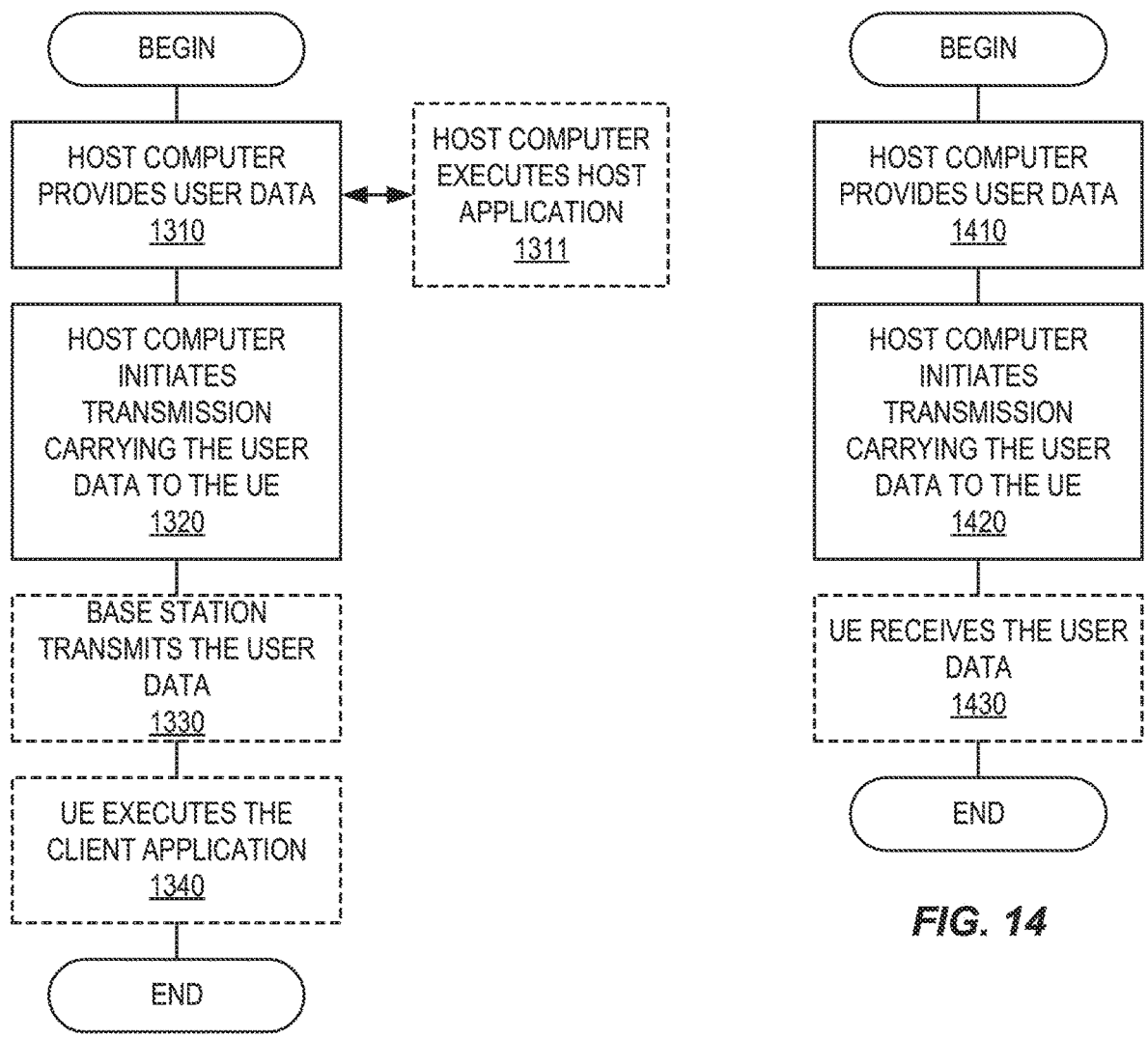

UPLINK CONTROL CHANNEL POWER CONTROL ADJUSTMENT IN A NETWORK WITH DIFFERENT PROCESSING TIMES

PRIORITY

This nonprovisional application is a U.S. National Stage Filing under 35 U.S.C. § 371 of International Patent Application Serial No. PCT/IB2018/058569 filed Nov. 1, 2018 and entitled "UPLINK CONTROL CHANNEL POWER CONTROL ADJUSTMENT IN A NETWORK WITH DIFFERENT PROCESSING TIMES" which claims priority to U.S. Provisional Patent Application No. 62/710,390 filed Feb. 16, 2018 both of which are hereby incorporated by reference in their entirety.

TECHNICAL FIELD

The disclosed subject matter relates generally to telecommunications. Certain embodiments relate more particularly to concepts such as power control adjustment.

BACKGROUND

Power control for a Physical Uplink Control Channel (PUCCH) is defined in 3rd Generation Partnership Project (3GPP) TS36.213 version 15.0.0 section 5.1.2.1 as, for subframe/slot/subslot i and serving cell c, $$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\}$$

for PUCCH format 1/1a/1b/2/2a/2b/3 and $$P_{PUCCH}(i) = \min\left\{\begin{array}{l} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array}\right\}$$

for PUCCH format 4/5, where:
- $P_{CMAX,c}(i)$ is the maximum transmit power.
- $P_{O\_PUCCH}$ is the target of received power.
- $PL_c$ is the downlink path loss estimate.
- $h(n_{CQI}, n_{HARQ}, n_{SR})$ is a PUCCH format dependent value that reflects cases with larger payload.
- $M_{PUCCH,c}(i)$ is the number of resource blocks for PUCCH format 5, equals 1 for all other formats.
- $\Delta_{F\_PUCCH}(F)$ is a relation in dB between PUCCH format F and PUCCH format 1a.
- $\Delta_{TF,c}(i)$ is an adjustment factor depending on number of coded bits that is exactly specified in 3GPP TS36.213.
- $\Delta_{TxD}(F')$ depends on the number of antenna ports configured for PUCCH.
- $g(i)$ is the closed loop power control state and is updated using the TPC command $\delta_{PUCCH}$ signaled in the downlink assignment as follows. It can be seen that the g(i) used for (S)PUCCH transmission in subframe/slot/subslot i depends on TPC command $\delta_{PUCCH}$ signaled in subframe/slot/subslot $i-k_m$.

$$g(i) = g(i-1) + \sum_{m=0}^{M-1} \delta_{PUCCH}(i-k_m)$$

where g(i) is the current PUCCH power control adjustment state and where g(0) is the first value after reset.

For Frequency Division Duplexing (FDD) or FDD-Time Division Duplexing (TDD) and primary cell frame structure type 1, M=1 and $k_0$=4 for subframe-based PUCCH, and for slot-based PUCCH if the TPC command is received in a slot: $k_0=X_P$ when the TPC command is received in a subslot.

Improved systems and methods for a wireless device controlling power for an uplink control channel are needed.

SUMMARY

Systems and methods are provided herein for uplink (UL) control channel power control adjustment. In some embodiments a method performed by a wireless device for controlling power for a UL control channel comprises receiving a first transmit power control (TPC) command, receiving at least a second TPC command, determining a power for an UL control channel transmission based on at least the first TPC command, the second TPC command, and a current UL control channel power adjustment state, and transmitting information via the UL control channel according to the determined power.

In some embodiments, more than two TPC commands that have an impact on the UL control channel power were received.

In some embodiments, the TPC commands were received in a downlink, DL, control information, DCI, message associated with DL data transmissions occurring at different time instants.

In some embodiments, the wireless device operates in a Frequency Division Duplex (FDD) system.

In some embodiments, at least one of the DL data transmissions has a shorter duration than the UL control channel transmission.

In some embodiments, the DL data transmissions have the same duration as the UL control channel and occur on different frequency carriers.

In some embodiments, computing the power for the UL control channel transmission based on the first TPC command and the second TPC command comprises computing the power for the UL control channel transmission as a sum of all received TPC commands associated with the UL control channel.

In some embodiments, computing the power for the UL control channel transmission based on the first TPC command and the second TPC command comprises choosing only one of all the received TPC commands associated with the UL control channel as the computed power.

In some embodiments, the only one of all the received TPC commands chosen is a last received TPC command. In some embodiments, the only one of all the received TPC commands chosen is a first received TPC command.

In some embodiments, a wireless device for controlling power for an UL control channel includes processing circuitry configured to: receive a first TPC command; receive at least a second TPC command; compute a power for a UL control channel transmission based on at least the first TPC command and the second TPC command; and adjust a power for the UL control channel according to the computed power. The wireless device also includes power circuitry configured to supply power to the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 13 is a schematic block diagram of the UE of FIG. 12 according to some other embodiments of the present disclosure;

FIG. 14 illustrates a telecommunication network connected via an intermediate network to a host computer in accordance with some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The technology background and implementation examples of the invention are given for the Long-Term Evolution (LTE) system (see below for the background on LTE frame structure and physical channels). However, the invention applies to any technology (e.g., New Radio (NR), 5G) relying on reference signal transmission where there is a predictable part of the signal that might be distorted, the part of the signal being distorted being known, while the actual distortion is possibly unknown.

LTE Frame Structure and Physical Channels for 1 ms TTI

Figure 1:
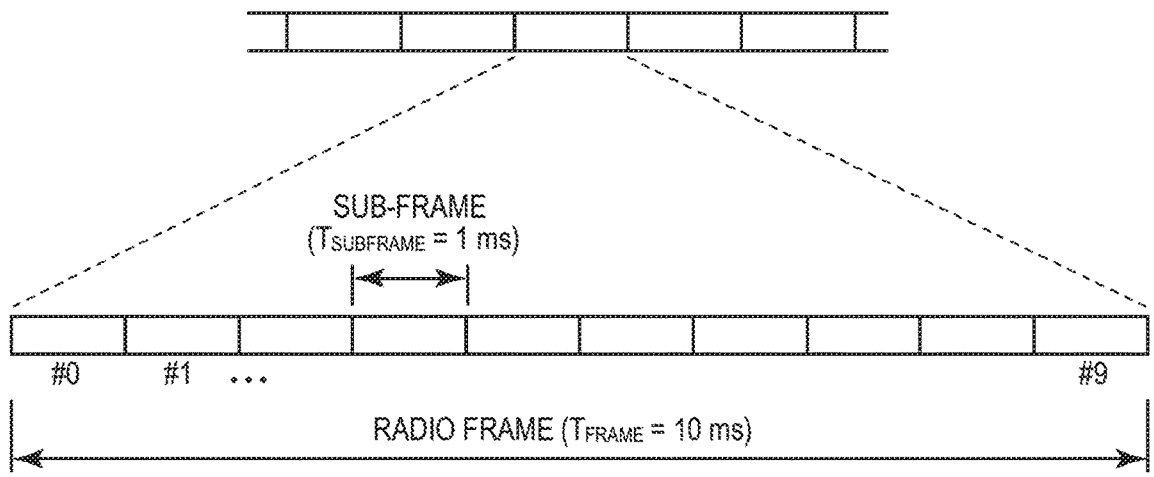
FIG. 1 illustrates a frame structure and physical channels for a 1 ms Transmit Time Interval (TTI) according to some embodiments of the present disclosure.

In 3rd Generation Partnership Project (3GPP) LTE systems, data transmissions in both downlink (e.g., from a network node or eNodeB (eNB) to a user device or user equipment (UE)) and uplink (from a user device or UE to a network node or eNB) are organized into radio frames of 10 ms, each radio frame includes ten equally-sized subframes of length Tsubframe=1 ms, as shown in FIG. 1.

Figure 2:
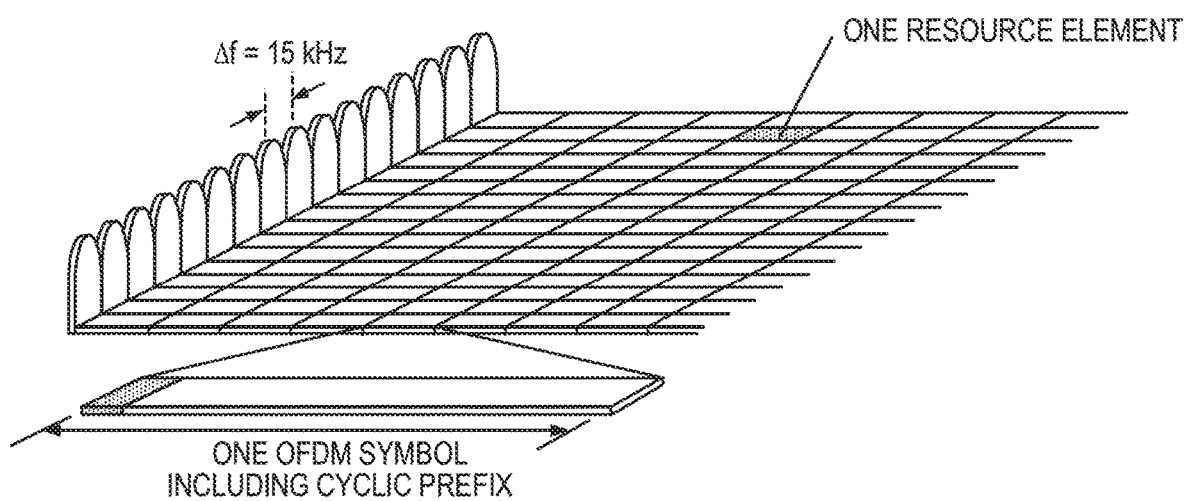
FIG. 2 illustrates a time-frequency grid of a Long Term Evolution (LTE) downlink physical resource according to some embodiments of the present disclosure.

LTE uses Orthogonal Frequency Division Multiple Access (OFDMA) in the downlink and Single Carrier FDMA (SC-FDMA) in the UL. The basic LTE downlink physical resource can thus be seen as a time-frequency grid as illustrated in FIG. 2, where each resource element corresponds to one Orthogonal Frequency Division Multiplexing (OFDM) subcarrier during one OFDM symbol interval.

Furthermore, the resource allocation in LTE is typically described in terms of resource blocks (RBs), where a resource block corresponds to one slot (0.5 ms) in the time domain and twelve contiguous subcarriers in the frequency domain. Resource blocks are numbered in the frequency domain, starting with zero from one end of the system bandwidth.

Figure 3:
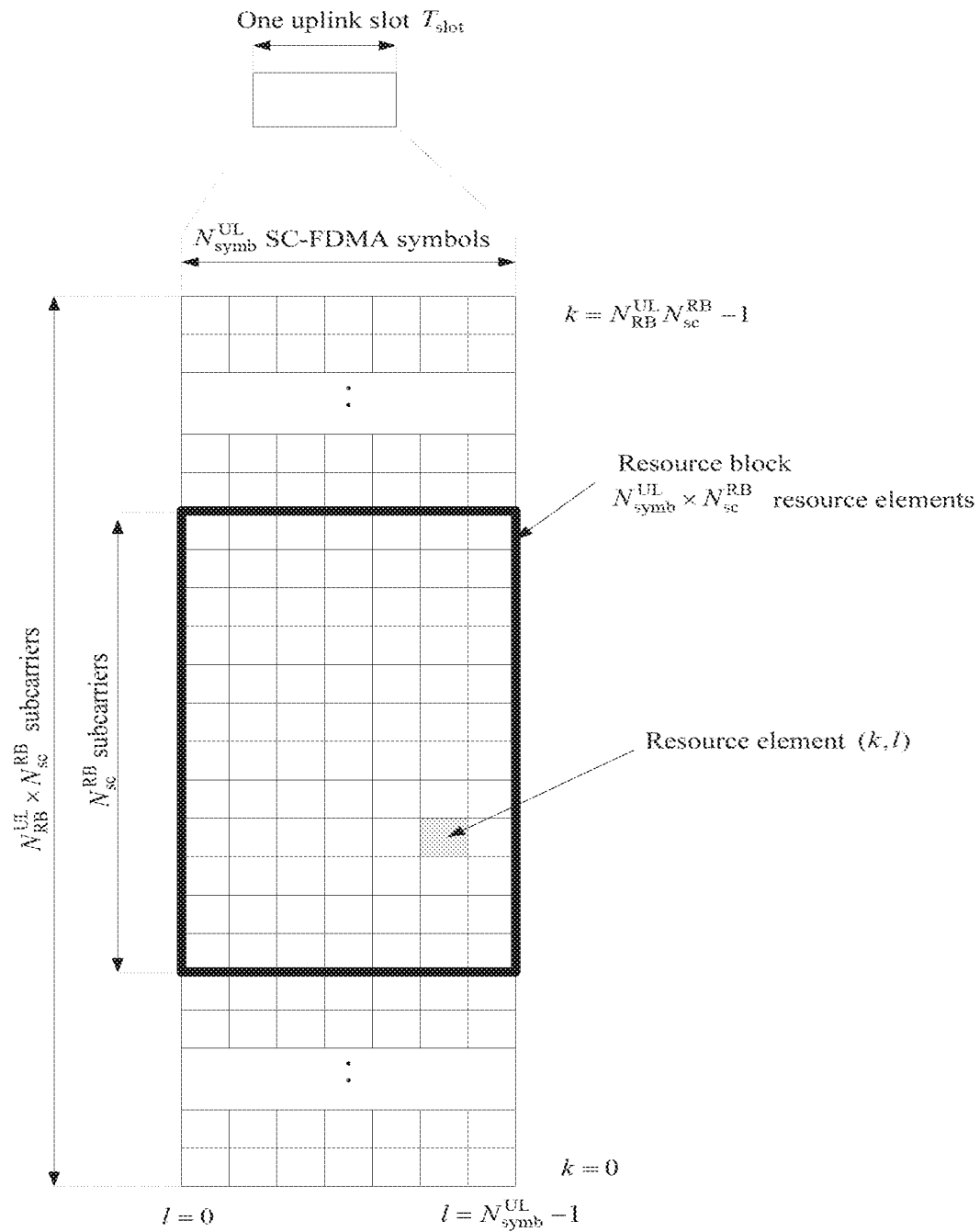
FIG. 3 illustrates an LTE uplink (UL) resource grid according to some embodiments of the present disclosure.

Similarly, the LTE UL resource grid is illustrated in FIG. 3, where $N_{RB}^{UL}$ is the number of resource blocks (RBs) contained in the UL system bandwidth, $N_{sc}^{RB}$ is the number subcarriers in each RB, typically $N_{sc}^{RB}=12$, $N_{symb}^{UL}$ is the number of SC-FDMA symbols in each slot. $N_{symb}^{UL}=7$ for normal cyclic prefix (CP) and $N_{symb}^{UL}=6$ for extended CP. A subcarrier and an SC-FDMA symbol form a UL resource element.

Figure 4:
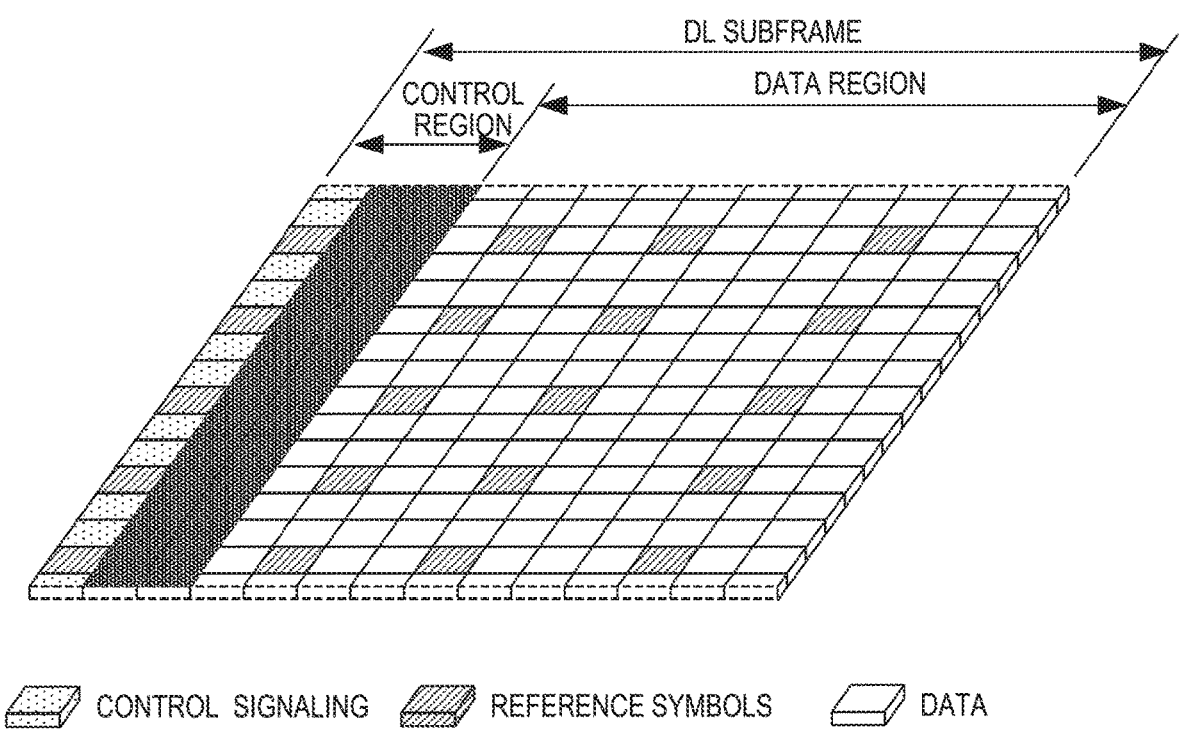
FIG. 4 illustrates a downlink system with 3 OFDM (Orthogonal Frequency Division Multiplexing) symbols as control according to some embodiments of the present disclosure.

Downlink data transmissions from an eNB to a UE are dynamically scheduled, e.g., in each subframe the base station transmits control information about to which terminals data is transmitted and upon which resource blocks the data is transmitted, in the current downlink subframe. This control signaling is typically transmitted in the first 1, 2, 3 or 4 OFDM symbols in each subframe. A downlink system with 3 OFDM symbols as control is illustrated in FIG. 4.

Transmissions in the UL (from a UE to an eNB) are, as in the downlink, also dynamically scheduled through the downlink control channel. When a UE receives UL grant in subframe n, it transmits data in the UL at subframe n+k, where k=4 for FDD system and k varies for TDD systems.

In LTE, a number of physical channels are supported for data transmissions. A downlink or an UL physical channel corresponds to a set of resource elements carrying information originating from higher layers. while a downlink or an UL physical signal is used by the physical layer but does not carry information originating from higher layers. Some of the downlink physical channels and signals supported in LTE are:

Physical Downlink Shared Channel (PDSCH)
Physical Downlink Control Channel (PDCCH)
Enhanced Physical Downlink Control Channel, (EPDCCH)
Reference signals:
  Cell Specific Reference Signals (CRS)
  DeModulation Reference Signal (DMRS) for PDSCH
  Channel State Information Reference Signals (CSI-RS)

PDSCH is used mainly for carrying user traffic data and higher layer messages in the downlink and is transmitted in a DL subframe outside of the control region as shown in FIG. 4. Both PDCCH and EPDCCH are used to carry Downlink Control Information (DCI) such as Physical Resource Block (PRB) allocation, modulation level and coding scheme (MCS), precoder used at the transmitter, etc. PDCCH is transmitted in the first one to four OFDM symbols in a DL subframe, e.g., the control region, while EPDCCH is transmitted in the same region as PDSCH.

Some of the UL physical channels and signals supported in LTE are:

Physical UL Shared Channel (PUSCH)
Physical UL Control Channel (PUCCH)
DeModulation Reference Signal (DMRS) for PUSCH
DeModulation Reference Signal (DMRS) for PUCCH The PUSCH is used to carry UL data or/and UL control information from the UE to the eNodeB. The PUCCH is used to carry UL control information from the UE to the eNodeB.

Carrier aggregation (CA) was introduced in LTE Release 10. If a UE is configured with CA, it can receive or transmit data on different frequency carriers at the same time (e.g., in the same subframe). This increases the UE throughput. Example: a UE is configured with DL CA of carrier0 that is 10 MHz bandwidth and carrier1 that has 20 MHz bandwidth. The UE can get a DL assignment for receiving a 10 MHz PDSCH on carrier0 and a DL assignment for receiving a 20 MHz PDSCH on carrier1 in the same subframe. Note that a carrier is also commonly named component carrier (CC). The term serving cell is also used to refer to a carrier from a UE perspective.

Latency Reduction with Shortened Processing Time and Short TTI

Packet data latency is one of the performance metrics that vendors, operators, and end-users (via speed test applications) regularly measure. Latency measurements are done in all phases of a radio access network system lifetime, when verifying a new software release or system component, when deploying a system and when the system is in commercial operation.

Shorter latency than previous generations of 3GPP Radio Access Technologies (RATs) was one performance metric that guided the design of Long Term Evolution (LTE). The end-users also now recognize LTE to be a system that provides faster access to internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the internet today. According to HTTP Archive (http://httparchive.org/trends.php) the typical size of HTTP based transactions over the internet are in the range of a few 10's of Kbyte up to 1 Mbyte. In this size range, the TCP slow start period is a significant part of the total transport period of the packet stream. During TCP slow start, the performance is latency limited. Hence, improved latency can rather easily be showed to improve the average throughput, for this type of TCP based data transactions.

Latency reductions could positively impact radio resource efficiency. Lower packet data latency could increase the number of transmissions possible within a certain delay bound; hence higher Block Error Rate (BLER) targets could be used for the data transmissions freeing up radio resources potentially improving the capacity of the system.

One approach to latency reduction is the reduction of processing time at the UE. In legacy LTE, the delay between an UL grant and an UL transmission is specified. Similarly, the delay between a DL data transmission and the DL HARQ feedback is specified. In LTE FDD, this delay is set to 4 ms. HARQ feedback for a DL data transmission received in subframe n is sent by the UE in subframe n+4. In LTE Rel 15 this processing time is shortened to 3 ms. The shortened processing time feature is configured for a UE over higher layer, e.g., Radio Resource Control (RRC). The shortened processing time feature can be configured independently for each carrier configured for a UE. Another discussed option is to configure shortened processing time for a group of CCs.

Another approach enabling the reduction of transport time of data and control signaling is to reduce the length of a transmission time interval (TTI). By reducing the length of a TTI and maintaining the bandwidth, the processing time at the transmitter and the receiver nodes is also expected to be reduced, due to less data to process within the TTI. In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols (os) in the case of extended cyclic prefix. In LTE release 15, shorter TTIs, such as a slot or a few symbols, are being specified.

An sTTI can be decided to have any duration in time and comprise resources on any number of OFDM or SC-FDMA symbols, and start at symbol position within the overall frame. For the work in LTE the focus of the work currently is to only allow the sTTIs to start at fixed positions with durations of either 2, 3 or 7 symbols. Furthermore, the sTTI is not allowed to cross neither slot nor subframe boundaries. The duration of 2 or 3 symbols is referred to as a subslot transmission while the 7 symbol duration is referred to as a slot transmission.

The allowed sTTI combinations for DL and UL in LTE are listed in Table 1.

TABLE 1

| Allowed {DL, UL} sTTI combinations | |
|---|---|
| DL | UL |
| Slot | Slot |
| Subslot | Slot |
| Subslot | Subslot |

HARQ Feedback Timing for Short TTI

In FDD with a slot TTI length configured in both UL and DL, a PDSCH scheduled in slot n receives its DL HARQ feedback in UL slot n+4. The HARQ feedback delay is thus 4 slots.

In FDD with a subslot TTI length configured in DL, the eNB can configure over RRC the HARQ feedback delay $X_p$ to take a value among a set of three values {4, 6, 8}.

In FDD with a subslot TTI length configured in both UL and DL, a PDSCH scheduled in subslot n receives its DL HARQ feedback in UL subslot $n+X_p$.

In FDD with a subslot TTI length configured in DL and a slot TTI length configured in UL, the PDSCH HARQ feedback of subslot PDSCH is mapped to the earliest possible UL slot. The HARQ feedback of subslot PDSCH in subslot #x of subframe #N is to be mapped on the 1-slot UL sTTI in slot #y of subframe #N+n for a DL HARQ feedback of k subslots, where $$y=\mod\{\lceil (x+k)/3 \rceil, 2\}$$

$$n=\lfloor \lceil (x+k)/3 \rceil /2 \rfloor$$

Consider that $X_p=6$, it means that PUCCH in slot 0 in subframe n carries HARQ feedback for subslot 4 and 5 of subframe n−2 and subslot 0 of subframe n−1. Slot 1 in subframe n carries HARQ feedback for subslot 1, 2, 3 of subframe n−1.

Consider that $X_p=4$, it means that PUCCH in slot 0 in subframe n carries HARQ feedback for subslot 0, 1, 2 of subframe n−1. Slot 1 in subframe n carries HARQ feedback for subslot 3, 4, 5 of subframe n−1.

Consider that $X_p=8$, it means that PUCCH in slot 0 in subframe n carries HARQ feedback for subslot 2, 3, 4 of subframe n−2. Slot 1 in subframe n carries HARQ feedback for subslot 5 of subframe n−2 and subslot 0 and 1 of subframe n−1.

Joint HARQ Feedback Transmission for Multiple DL Transmissions

Figure 5:
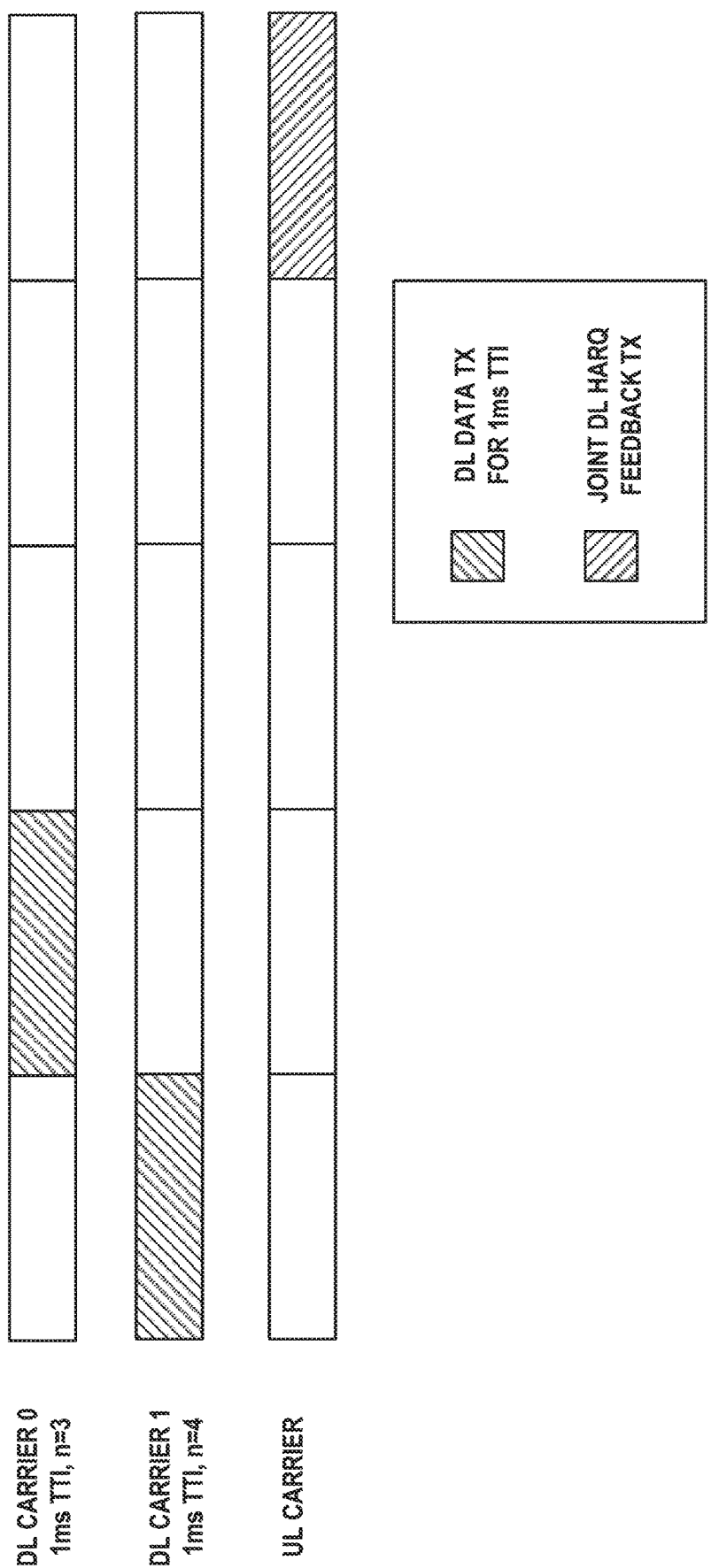
FIG. 5 illustrates a UL collision of 1 ms TTI transmissions of different processing times and joint transmission of their HARQ (Hybrid Automatic Repeat Request) feedback according to some embodiments of the present disclosure.

Joint HARQ Feedback Transmission for 1 ms TTI DL Transmissions of Different Processing Times For a UE configured with CA, the shortened processing time is configured independently for each component carrier. This means that PDSCH scheduled in the carriers not configured with shortened processing time have their HARQ feedback in subframe n+4 and PDSCH scheduled in the carriers configured with shortened processing time have their HARQ feedback in subframe n+3. Consequently, the UL control channel sent in subframe n may carry HARQ feedback for PDSCH that was sent on a carrier configured with shortened processing time in subframe n−3 and HARQ feedback for PDSCH that was sent on another carrier not configured with shortened processing time in subframe n−4. In other words, the UE needs to feed back Ack/Nack status for two different reaction times in the same UL control channel, or UL control information. That is, out of N reported A/N bits in the UL control information, X could represent status from a first reaction time, and N−x could represent the status for a second reaction time, e.g., that the blocks, which received status are fed back have been transmitted in different times on the DL. FIG. 5 gives an example where a 1 ms TTI transmission on carrier 0 has a processing time of n+3 (e.g., 3 ms) while the 1 ms TTI transmission on carrier 1 has a processing time of n+4 (e.g., 4 ms). There is a single UL carrier allowed to carry the HARQ feedback for both DL carriers. Consequently, depending on two subframes scheduled at different times on carrier 0 and carrier 1 may expect HARQ feedback in the same UL subframe on the same UL carrier. Therefore, their HARQ feedback should be jointly reported.

Joint HARQ Feedback Transmission for Multiple sTTI DL Transmissions

Figure 6:
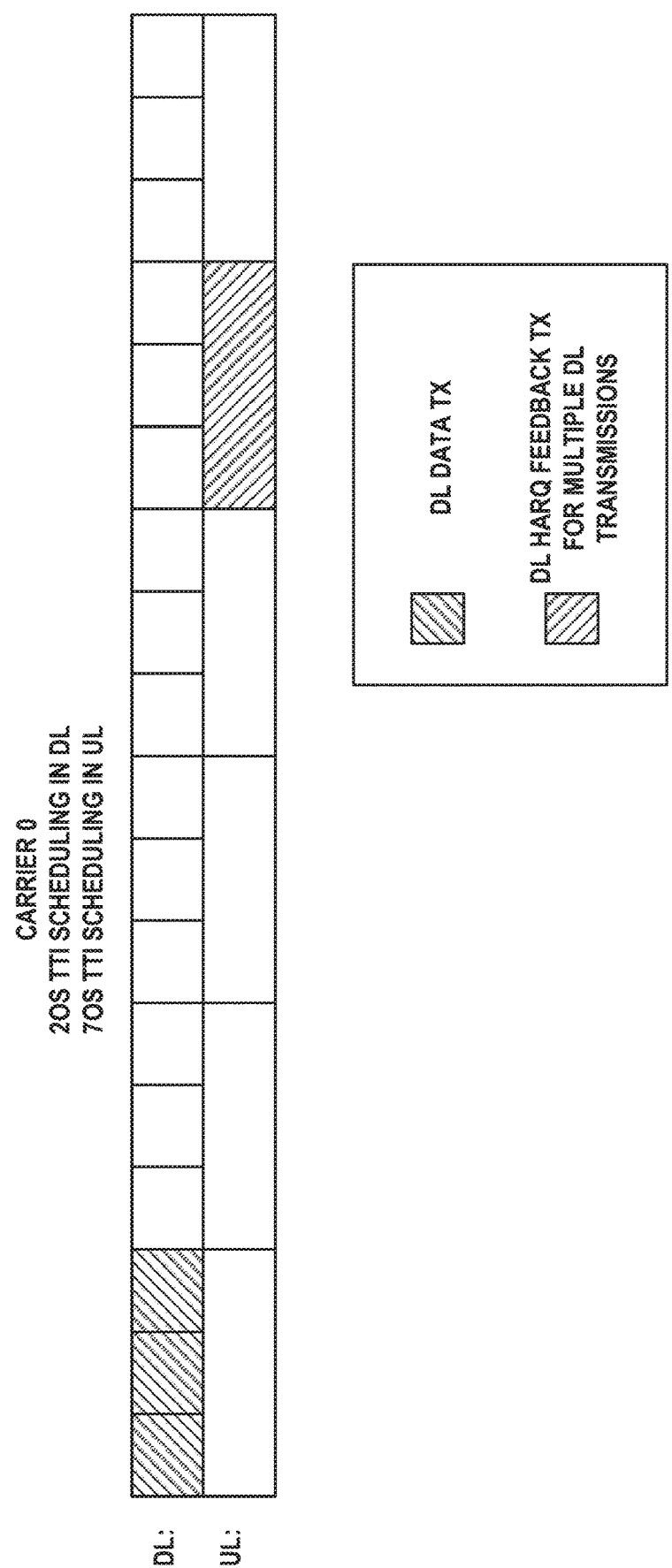
FIG. 6 illustrates joint transmission of HARQ feedback for multiple downlink (DL) TTI transmissions of shorter length than the UL TTI length according to some embodiments of the present disclosure.

A similar problem occurs when the TTI length in UL and DL is not symmetric, see Table 1. For instance, there may be a 2/3os TTI length in DL, also called a subslot DL transmission, while the TTI length in UL is 7os, also called a slot transmission. This is illustrated in FIG. 6. In that case, since there are more DL subslots per subframe, e.g., 6, than there are UL slots per subframe e.g., 2, HARQ feedback for multiple DL subslot data transmissions, e.g., 3, are fed back in the same UL slot transmission.

This scenario could involve a single carrier transmission on DL, e.g., all subslot transmissions that expect HARQ feedback in the same UL transmission are performed on the same DL carrier.

UL Control Information (UCI)

UL control information (UCI) includes HARQ feedback (e.g., feedback from the receiving node on the state of the received blocks, Ack/Nack), and possibly channel state information.

The UCI can be carried in a control channel dedicated for control, the Physical UL Control Channel, PUCCH. Alternatively, the UCI can be carried by the Physical UL Shared Data Channel (PUSCH) multiplexed with the data. That is, if a UE is granted UL transmission at the same time it is scheduled to transmit the UCI. In case the UE does not support, or is not configured with simultaneous transmission of PUSCH and PUCCH, the UCI that could be transmitted on PUCCH, is instead multiplexed with the data on PUSCH. It can be noted that PUSCH can also be scheduled by an UL grant to only carry UCI.

The same principle of PUSCH and PUCCH applies irrespective of the transmission time interval (TTI) of the channel, e.g., also using shortened TTI, sTTI, the UCI of sPUCCH can be carried by sPUSCH.

Power Control for PUCCH

Power control for PUCCH is defined in 3GPP TS36.213 version 15.0.0 section 5.1.2.1 as, for subframe/slot/subslot i and serving cell c, $$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\}$$

for PUCCH format 1/1a/1b/2/2a/2b/3 and $$P_{PUCCH}(i) = \min \left\{ \begin{array}{l} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array} \right\}$$

for PUCCH format 4/5, where
- $P_{CMAX,c}(i)$ is the maximum transmit power.
- $P_{O\_PUCCH}$ is the target of received power.
- $PL_c$ is the downlink path loss estimate.
- $h(n_{CQI}, n_{HARQ}, n_{SR})$ is a PUCCH format dependent value that reflects cases with larger payload.
- $M_{PUCCH,c}(i)$ is the number of resource blocks for PUCCH format 5, equals 1 for all other formats.
- $\Delta_{F\_PUCCH}(F)$ is a relation in dB between PUCCH format F and PUCCH format 1a.
- $\Delta_{TF,c}(i)$ is an adjustment factor depending on number of coded bits that is exactly specified in 3GPP TS36.213.
- $\Delta_{TxD}(F')$ depends on the number of antenna ports configured for PUCCH.
- g(i) is the closed loop power control state and is updated using the TPC command $\delta_{PUCCH}$ signaled in the downlink assignment as follows. It can be seen that the g(i) used for (S)PUCCH transmission in subframe/slot/subslot i depends on TPC command $\delta_{PUCCH}$ signaled in subframe/slot/subslot $i-k_m$.

$$g(i) = g(i-1) + \sum_{m=0}^{M-1} \delta_{PUCCH}(i-k_m)$$

where g(i) is the current PUCCH power control adjustment state and where g(0) is the first value after reset.

For FDD or FDD-TDD and primary cell frame structure type 1, M=1 and
- $k_0=4$ for subframe-based PUCCH, and for slot-based PUCCH if the TPC command is received in a slot
- $k_0=X_p$ when the TPC command is received in a subslot There currently exist certain challenge(s). A UE should send in the same UL control channel transmission HARQ feedback for DL transmissions that occur at different times. A TPC command field is included in the assignment/Downlink Control Indicator (DCI) for each DL transmission. How the multiple TPC commands should be used to adjust the PUCCH power is not defined in the specifications. This problem is new for a FDD system.

Certain aspects of the present disclosure and their embodiments may provide solutions to these or other challenges. It is proposed to either use all TPC commands included in the DCI of PDSCH subframe/slot/subslots that have their HARQ feedback in the same UL transmission or to use only one of the TPC commands included in the DCI of the corresponding PDSCH (for instance the first received TPC command).

There are, proposed herein, various embodiments which address one or more of the issues disclosed herein.

Certain embodiments may provide one or more of the following technical advantage(s). It clarifies the UE behavior in terms of UL power setting in case multiple PDSCH transmissions with HARQ feedback in the same UL transmission are scheduled, especially if these multiple PDSCH transmissions are scheduled at different times. In addition, a method gives flexibility to the network to correct the previously sent TPC with a more adequate value.

Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Systems and methods are provided herein for UL control channel power control adjustment. In some embodiments a method performed by a wireless device for controlling power for an UL control channel includes receiving a first transmit power control (TPC) command; receiving at least a second TPC command; computing a power for the UL control channel transmission based on at least the first TPC command and the second TPC command; and adjusting a power for the UL control channel according to the computed power. In this way, the wireless device behavior is clarified in terms of UL power setting in case multiple transmissions with feedback in the same UL transmission are scheduled, especially if these multiple transmissions are scheduled at different times.

Figure 7:
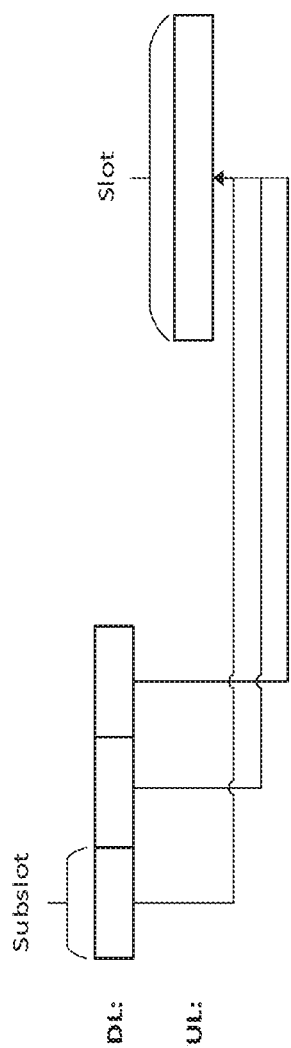
FIG. 7 illustrates a processing time illustration of multiple DL subslot transmissions combined with a common UL slot transmission according to some embodiments of the present disclosure.

The following embodiments are described for the transmission of subslot in the DL and slot in the UL, see Table 1. In this case, the three DL sTTIs of a LTE slot is fed back in a single UL slot as illustrated in FIG. 7. That is, there is a different timing/processing time comparing the first, second and third DL sTTI of the slot to the common UL slot. This scenario could involve a single carrier transmission on DL, e.g., all subslot transmissions that expect HARQ feedback in the same UL transmission are performed on the same DL carrier.

It should be noted that the methods listed below would also be applicable to the case of the same transmission duration in UL and DL and a shortened processing time configured for some of the DL carriers. In that case, the HARQ feedback for two DL data transmissions having different required processing time should be reported in the same UL subframe in a FDD system. This is one of the scenarios described above. In this scenario, these DL data transmissions are scheduled on different carriers that are configured with different processing timings.

Sum of all Received TPC

In one embodiment, the closed loop power control state g(i) is updated based on the sum over all TPC commands received from scheduled PDSCH that have their HARQ feedback in the PUCCH transmission for which g(i) applies.

Consider the example of the equation, $$g(i) = g(i-1) + \sum_{m=0}^{M-1} \delta_{PUCCH}(i-k_m),$$

and the case of a subslot PDSCH transmission with HARQ feedback in a slot PUCCH transmission. PDSCHs scheduled in 3 consecutive subslots have HARQ feedback in the same UL slot PUCCH. Thus, this embodiment means that M=3 and that $i-k_m$ corresponds to the index of the three last subslots sent at the latest $X_p$ subslots earlier than the start of the slot PUCCH.

Consider that $X_p=6$, it means that the closed loop power control state for PUCCH in slot 0 in subframe n depends on the TPC command $\delta_{PUCCH}$ received in the DL DCI sent in subslot 4 and 5 of subframe n−2 and subslot 0 of subframe n−1. For PUCCH, in slot 1 of subframe n the TPC command $\delta^{PUCCH}$ received in the DL DCI sent in subslots 1, 2, 3 of subframe n−1 are of relevance.

Only One of all Received TPC

In one embodiment, the closed loop power control state g(i) is updated based on only one of all TPC commands received from scheduled PDSCH that have their HARQ feedback in the PUCCH transmission for which g(i) applies.

In a variant of this embodiment, the first received TPC command is applied and the later received TPC commands for the same PUCCH transmission are ignored.

In a variant of this embodiment, the last received TPC command is applied and the previously received TPC commands for the same PUCCH transmission are ignored. This enables to update the TPC command to a more appropriate value if some conditions changed between the last TPC command sent for the same PUCCH transmission.

In a variant of this embodiment, the UE is not expected to receive more than one (non-zero) TPC command in the DCI of the scheduled PDSCH DCI that have their HARQ feedback in the PUCCH transmission.

In this disclosure, a first node and a second node may be used as two. An example of a first node could be a network node, which could be a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in a distributed antenna system (DAS), core network nodes (e.g., Mobile Switching Centers (MSCs), Mobile Management Entities (MMEs) etc.), Operations and Management (O&M), Operations Support Systems (OSSs), Self-Organizing Networks (SONs), positioning nodes (e.g., Evolved Serving Mobile Location Centers (E-SMLCs)), Minimization of Drive Tests (MDTs), etc.)

Another example of a node could be user equipment. This is a non-limiting term user equipment (UE) and it refers to any type of wireless device communicating with a network node and/or with another UE in a cellular or mobile communication system. Examples of UE are target device, device to device (D2D) UE, machine type UEs or UEs capable of machine to machine (M2M) communication, PDA, iPad, Tablet, mobile terminals, smart phone, laptop embedded equipped (LEE), laptop mounted equipment (LME), Universal Serial Bus (USB) dongles etc.

In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

In this disclosure, any of the above mentioned nodes could become "the first node" and/or "the second node".

The term radio access technology, or RAT, may refer to any RAT e.g., UTRA, E-UTRA, narrow band internet of things (NB-IoT), WiFi, Bluetooth, next generation RAT (NR), 4th Generation (4G), 5th Generation (5G), etc. Any of the first and the second nodes may be capable of supporting a single or multiple RATs.

The term signal used herein can be any physical signal or physical channel Examples of physical signals are reference signals such as Primary Synchronization Signals (PSSs), Secondary Synchronization Signals (SSSs), Cell Specific Reference Signals (CRSs), Positioning Reference Signals (PRSs) etc. The term physical channel (e.g., in the context of channel reception) used herein is also called as 'channel. Examples of physical channels are Master Information Blocks (MIB), Physical Broadcasting Channels (PBCHs), Narrowband Physical Broadcasting Channels (NPBCHs), PDCCHs, PDSCHs, Short Physical Uplink Control Channels (sPUCCHs), Short Physical Downlink Shared Channels sPDSCHs, Short Physical Downlink Control Channels (sPDCCHs), Short Physical Uplink Shared Channels (sPUSCHs), Massive Physical Uplink Control Channels (MPDCCHs), Narrow Physical Downlink Control Channels (NPDCCHs), Narrow Physical Downlink Shared Channels (NPDSCHs), Enhanced Physical Downlink Control Channels (E-PDCCHs), PUSCHs, PUCCHs, Narrow Physical Downlink Shared Channels (NPUSCHs), etc.

The term time resource used herein may correspond to any type of physical resource or radio resource expressed in terms of length of time. Examples of time resources are: symbols, time slots, subframes, radio frames, TTIs, interleaving times, etc.

The term TTI used herein may correspond to any time period (TO) over which a physical channel can be encoded and interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe etc.

The term requirements used herein may comprise any type of UE requirements related to UE measurements aka radio requirements, measurement requirements, Radio Resource Management (RRM) requirements, mobility requirements, positioning measurement requirements etc. Examples of UE requirements related to UE measurements are measurement time, measurement reporting time or delay, measurement accuracy (e.g., Reference Signal Received Power (RSRP)/Reference Signal Received Quality (RSRQ) accuracy), number of cells to be measured over the measurement time etc. Examples of measurement time are L1 measurement period, cell identification time or cell search delay, Cell Global Identifier (CGI) acquisition delay etc.

Figure 8:
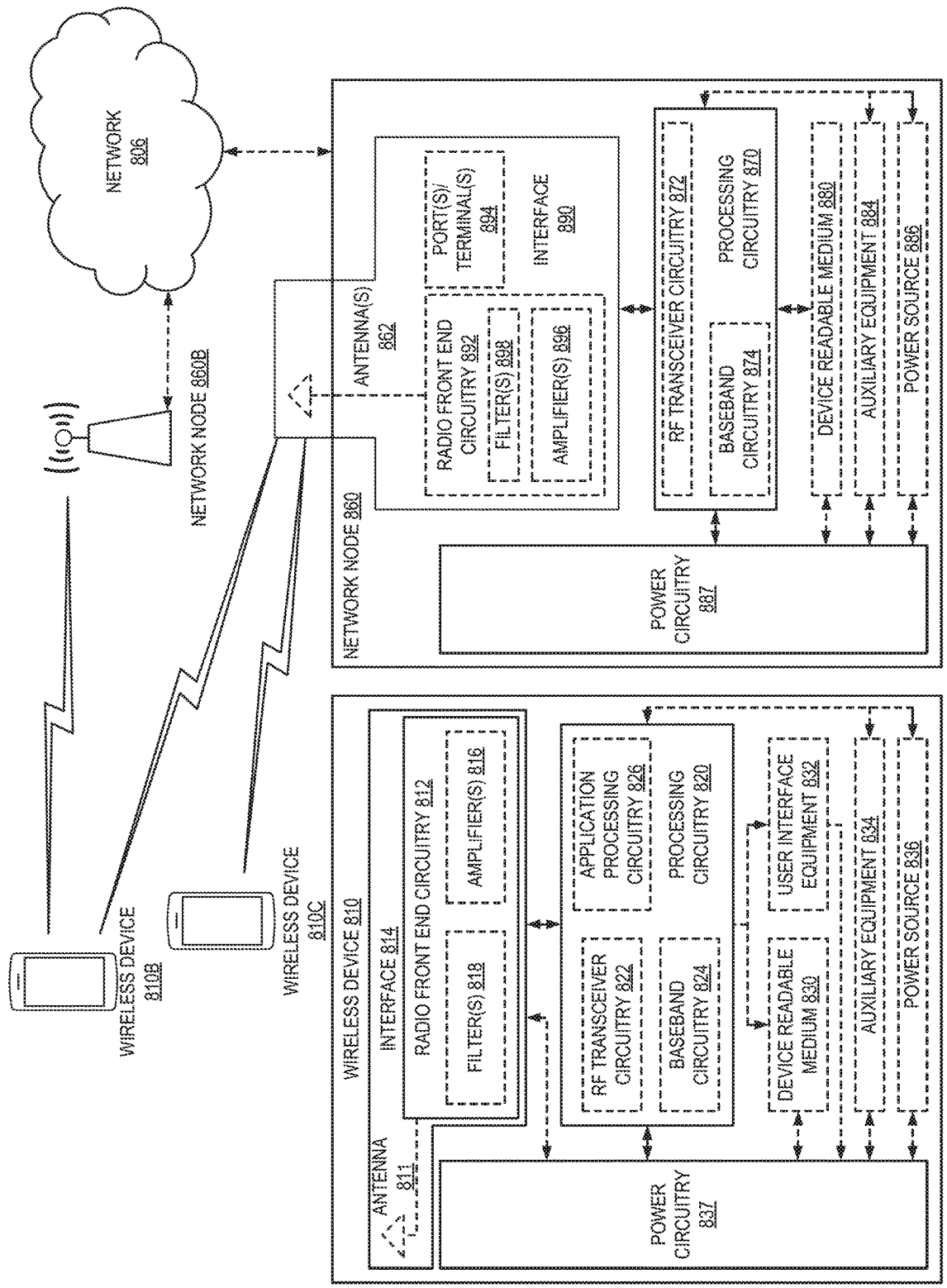
FIG. 8 illustrates one example of a cellular communications network according to some embodiments of the present disclosure.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks, packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeBs. In such a scenario, each unique NodeB and RNC pair may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk or a Digital Video Disk), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892; instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector, or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data, and/or signals may be received from a wireless device, another network node, and/or any other network equipment. Similarly, antenna 862, interface 890, and/or processing circuitry 870 may be configured to perform any transmitting operations described herein as being performed by a network node. Any information, data, and/or signals may be transmitted to a wireless device, another network node, and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged, and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP phone, a wireless local loop phone, a desktop computer, a personal digital assistant, a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment, a vehicle-mounted wireless terminal device, etc. A WD may support device-to-device (D2D) communication, for example by implementing a 3GPP standard for sidelink communication, vehicle-to-vehicle, vehicle-to-infrastructure, vehicle-to-everything and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays configured to send and/or receive wireless signals and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data, and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprises one or more filters 818 and amplifiers 816. Radio front end circuitry 812 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband circuitry 824, and application processing circuitry 826. In other embodiments, the processing circuitry may comprise different components and/or different combinations of components. In certain embodiments, processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some, or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk or a Digital Video Disk), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
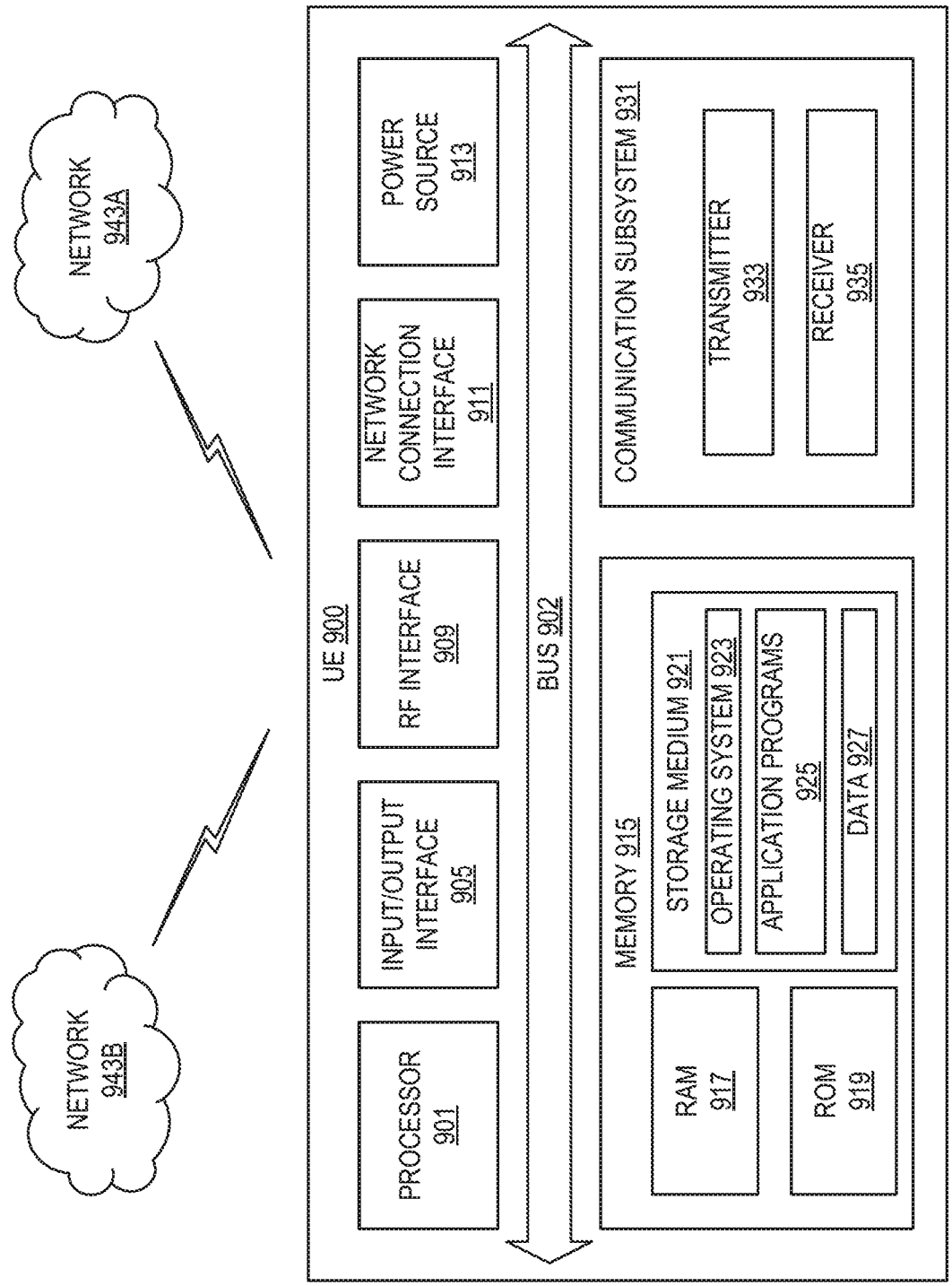
FIG. 9 is a schematic block diagram of a radio access node according to some embodiments of the present disclosure.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 913, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, Field Programmable Gate Arrays (FPGAs), Application Specific Integrated Circuits (ASICs), etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943*a*. Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, Synchronous Optical Networking (SONET), Asynchronous Transfer Mode (ATM), or the like. Network connection interface 911 may implement receiver and transmitter functionality appropriate to the communication network links (e.g., optical, electrical, and the like). The transmitter and receiver functions may share circuit components, software, or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks, floppy disk drive, flash memory, USB flash drive, external hard disk drive, thumb drive, pen drive, key drive, high-density digital versatile disc optical disc drive, internal hard disk drive, Blu-Ray optical disc drive, holographic digital data storage optical disc drive, external mini-dual in-line memory module (DIMM), synchronous dynamic random access memory (SDRAM), external micro-DIMM SDRAM, smartcard memory such as a subscriber identity module or a removable user identity module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software, or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current or direct current power to components of UE 900.

The features, benefits, and/or functions described herein may be implemented in one of the components of UE 900 or partitioned across multiple components of UE 900. Further, the features, benefits, and/or functions described herein may be implemented in any combination of hardware, software, or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
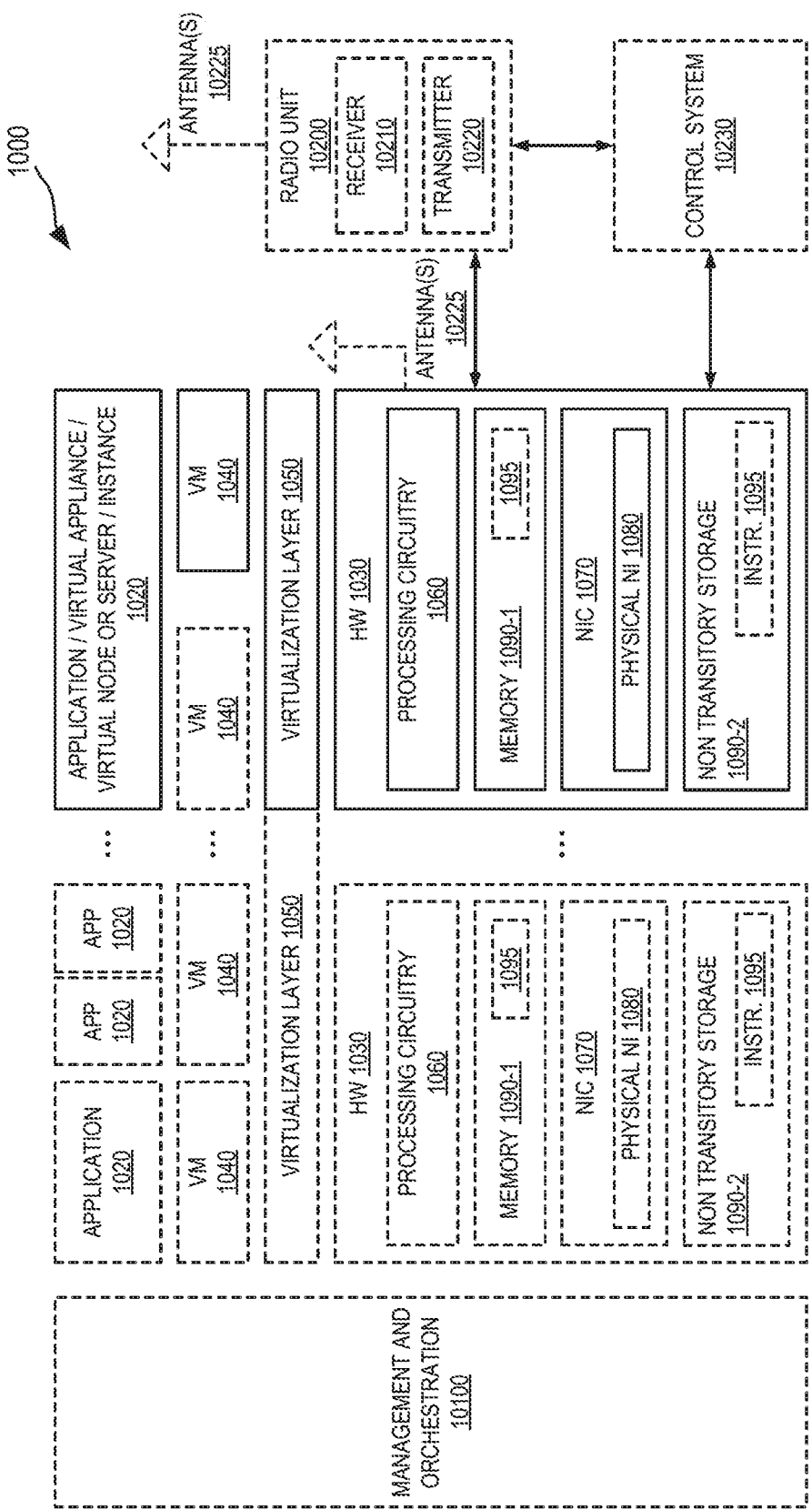
FIG. 10 is a schematic block diagram that illustrates a virtualized embodiment of the radio access node of FIG. 9 according to some embodiments of the present disclosure.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090 (e.g., 1090-1 and 1090-2). Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040 comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor. Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g., such as in a data center or customer premise equipment) where many hardware nodes work together and are managed via management and orchestration 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of a hardware networking infrastructure 1030 and corresponds to application 1020 in FIG. 10.

In some embodiments, one or more radio units 10200 that each includes one or more transmitters 10220 and one or more receivers 10210 which may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be effected with the use of control system 10230 which may alternatively be used for communication between the hardware nodes 1030 and radio units 10200.

Figure 11:
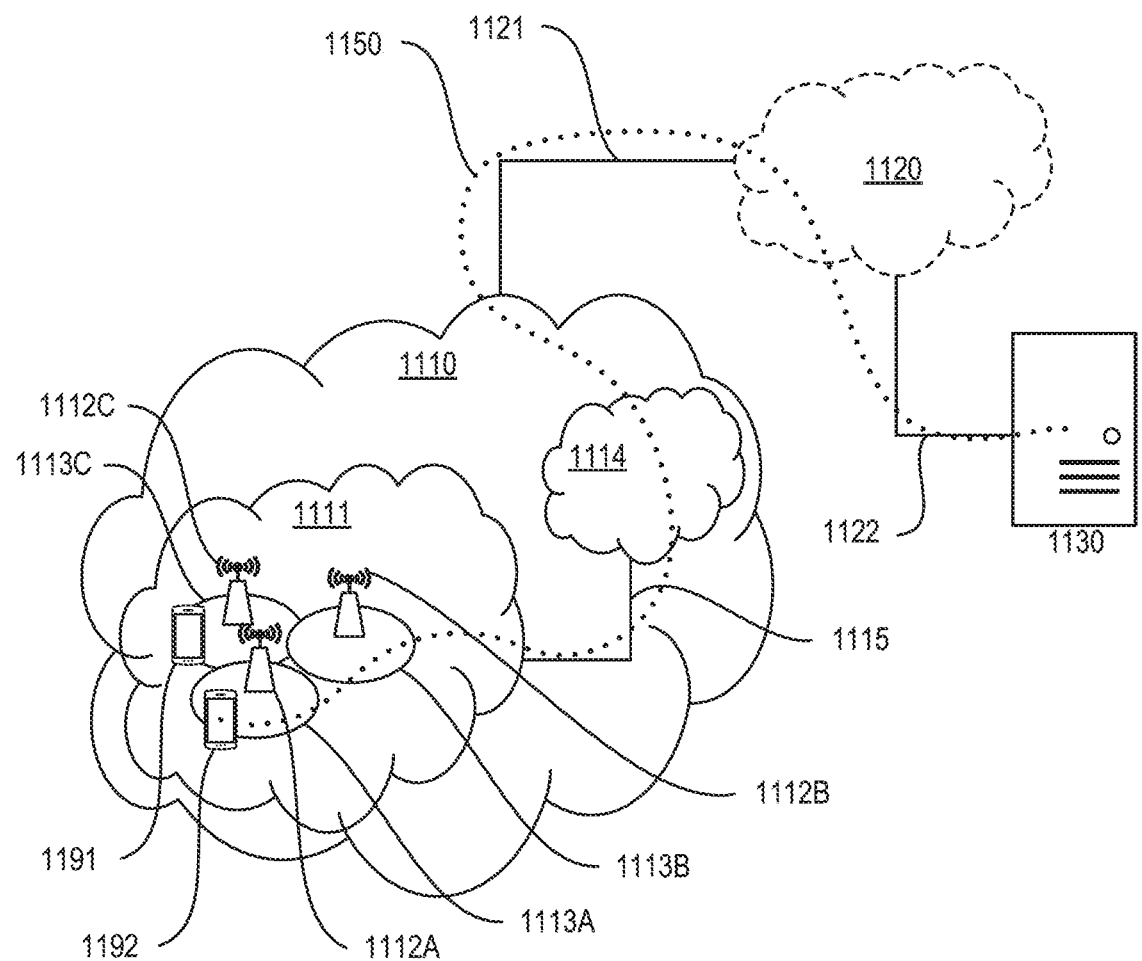
FIG. 11 is a schematic block diagram of the radio access node of FIG. 9 according to some other embodiments of the present disclosure.

With reference to FIG. 11, in accordance with an embodiment, a communication system is illustrated which includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of UL and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing UL communication originating from the UE 1191 towards the host computer 1130.

Example implementations in accordance with an embodiment of the UE, base station, and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230, already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
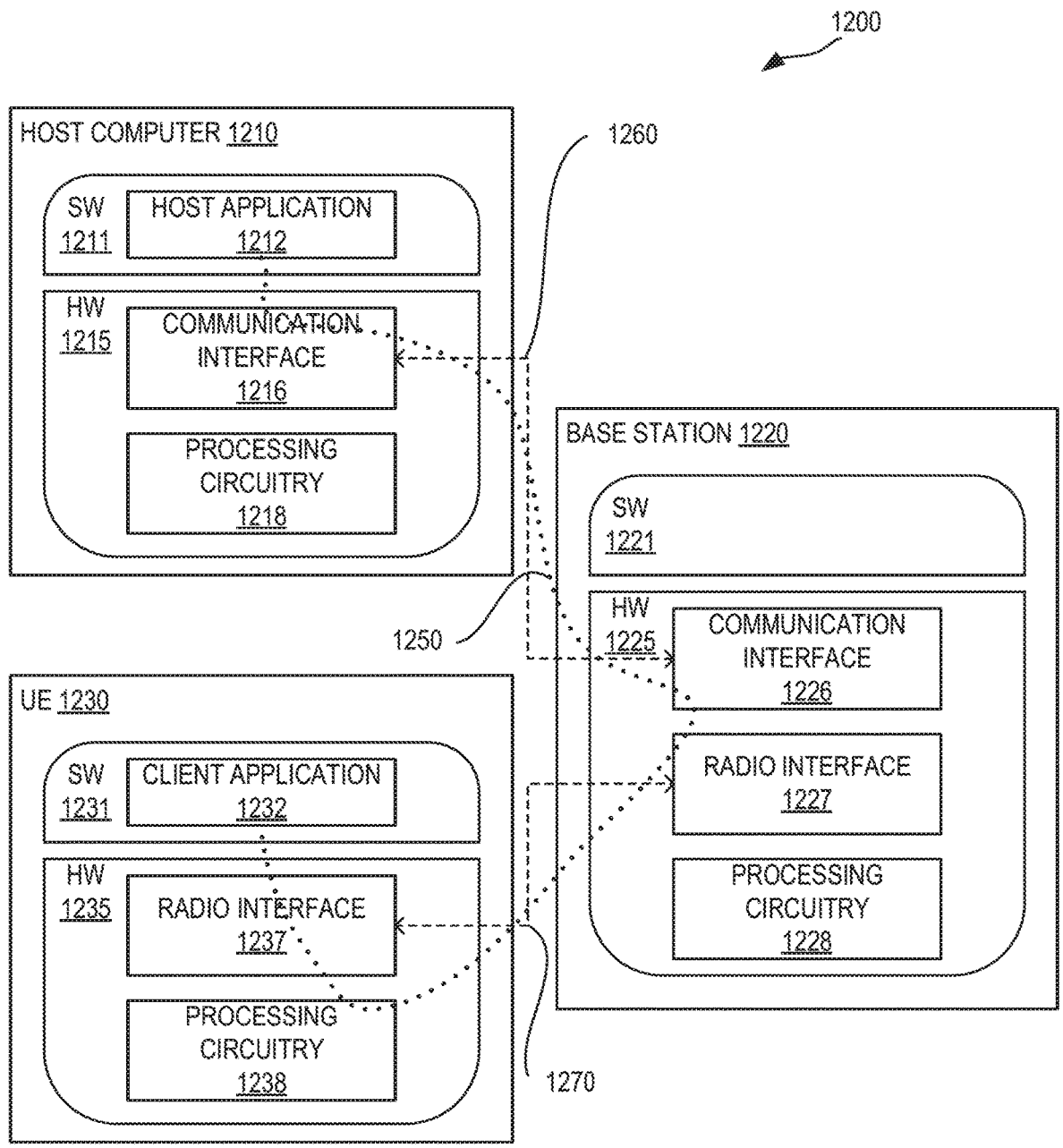
FIG. 12 is a schematic block diagram of a User Equipment device (UE) according to some embodiments of the present disclosure.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the UE behavior in terms of UL power setting in case multiple PDSCH transmissions with HARQ feedback in the same UL transmission are scheduled and thereby provide benefits such as improving UE response when multiple PDSCH transmissions are scheduled at different times.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 15, 16:
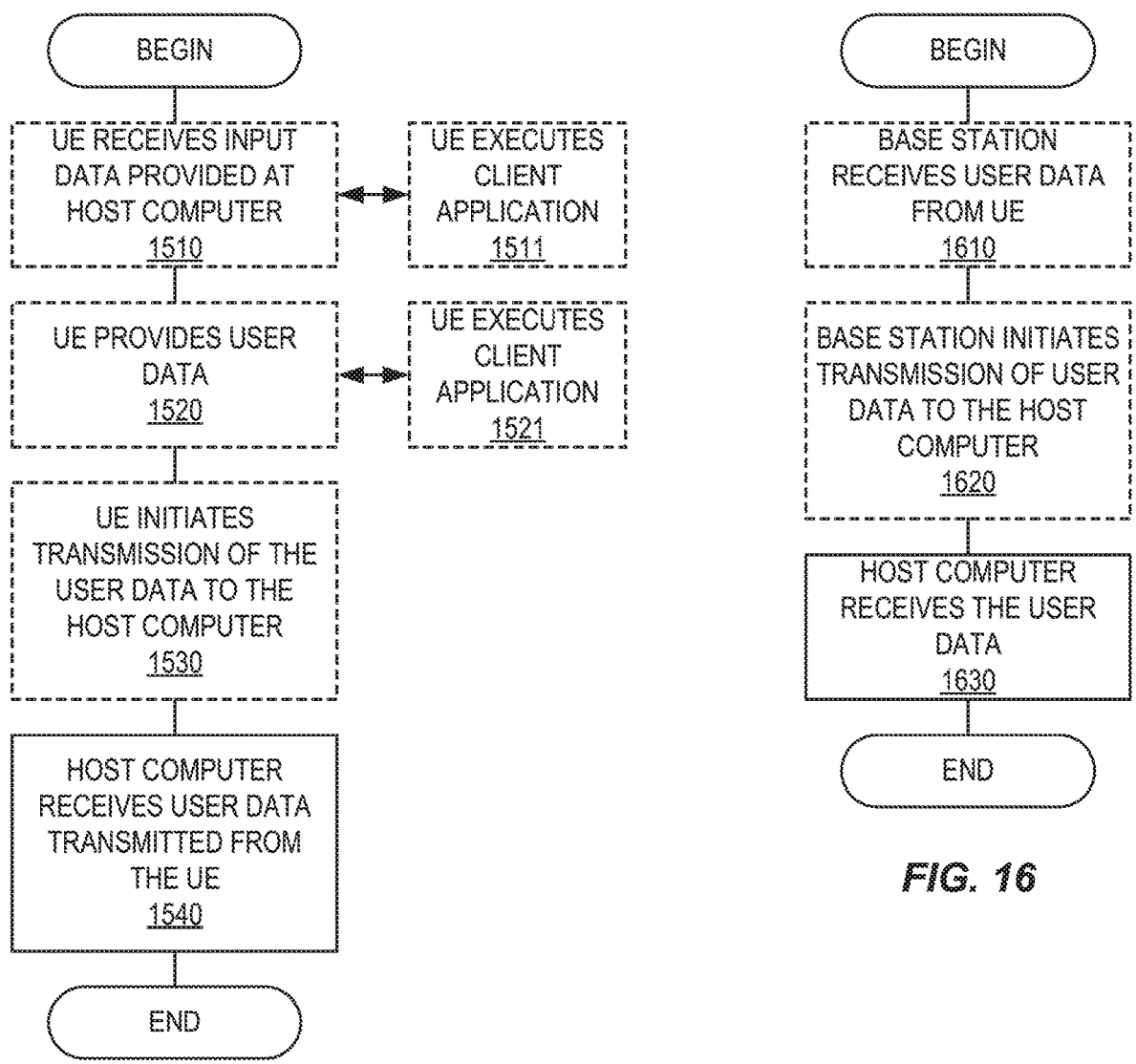
FIG. 15 is a generalized block diagram of a host computer communicating via a base station with a UE over a partially wireless connection in accordance with some embodiments of the present disclosure.
FIG. 16 is a flowchart illustrating a method implemented in a communication system in accordance with one embodiment of the present disclosure.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally, or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 17:
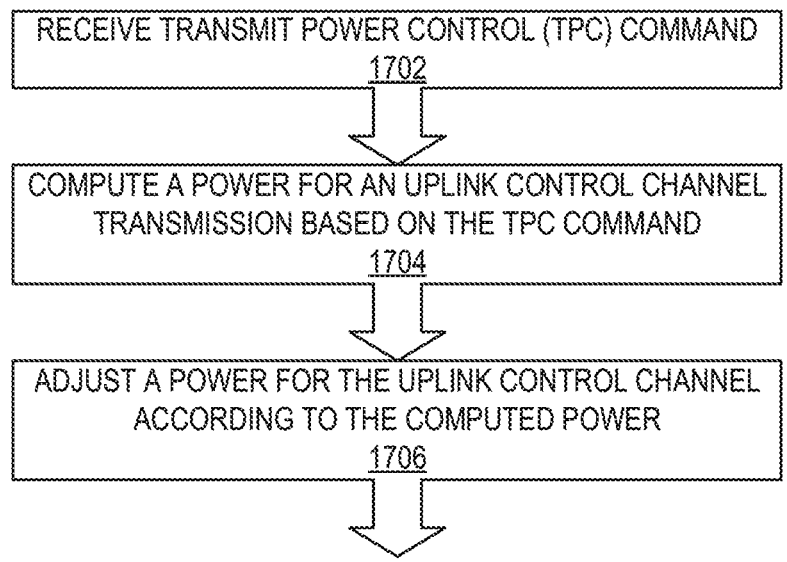
FIG. 17 is a flowchart illustrating a method implemented in a communication system in accordance with one embodiment of the present disclosure.

FIG. 17 depicts a method in accordance with particular embodiments, the method begins at step 1702 with a UE receiving a TPC command. In step 1704, the UE computes a power for an UL control channel transmission based on the TPC command. In step 1706, the UE adjusts a power for the UL control channel according to the computed power.

Figure 18:
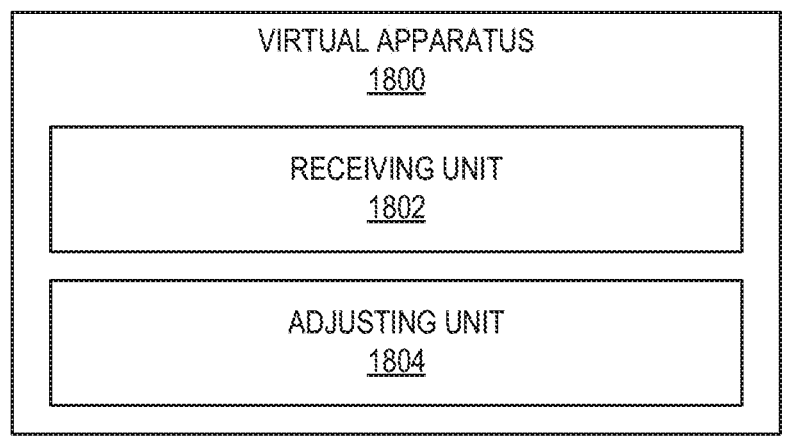
FIG. 18 illustrates a schematic block diagram of an apparatus in a wireless network.

FIG. 18 illustrates a schematic block diagram of an apparatus 1800 in a wireless network (for example, the wireless network shown in FIG. 8). The apparatus may be implemented in a wireless device or network node (e.g., wireless device 810 or network node 860 shown in FIG. 8). Apparatus 1800 is operable to carry out the example method described with reference to FIG. 17 and possibly any other processes or methods disclosed herein. It is also to be understood that the method of FIG. 17 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1802 and adjustment unit, and any other suitable units of apparatus 1800 to perform corresponding functions according one or more embodiments of the present disclosure.

As illustrated in FIG. 18, apparatus 1800 includes receiving unit 1802 and adjusting unit 1804. Receiving unit 1802 is configured to receive a TPC command. Adjusting unit 1804 is configured to compute a power for an UL control channel transmission based on the TPC and to adjust a power for the UL control channel according to the computed power.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Those skilled in the art will recognize improvements and modifications to the embodiments of the present disclosure. All such improvements and modifications are considered within the scope of the concepts disclosed herein.

What is claimed is:

1. A method performed by a wireless device for controlling power for an uplink, UL, control channel, the method comprising:
   receiving a first transmit power control, TPC, command;
   receiving at least a second TPC command; and
   determining a power for an UL control channel transmission based on at least the first TPC command, the second TPC command, and a current UL control channel power adjustment state, wherein the at least two TPC commands comprise at least two TPC commands that have an impact on the power for the UL control channel; and
   transmitting information via the UL control channel according to the determined power.

2. The method of claim 1, wherein the TPC commands were received in a downlink, DL, control information, DCI, message associated with DL data transmissions occurring at different time intervals.

3. The method of claim 1, wherein the wireless device operates in a Frequency Division Duplex, FDD, system.

4. The method of claim 2, wherein at least one of the DL data transmissions has a shorter duration than the UL control channel transmission.

5. The method of claim 2, where the DL data transmissions have a same duration as the UL control channel and occur on different frequency carriers.

6. The method of claim 1, wherein computing the power for the UL control channel transmission based on the first TPC command and the second TPC command comprises computing the power for the UL control channel transmission as a sum of all received TPC commands associated with the UL control channel.

7. The method of claim 1, wherein computing the power for the UL control channel transmission based on the first TPC command and the second TPC command comprises choosing only one of all received TPC commands associated with the UL control channel as the computed power.

8. The method of claim 7, wherein the only one of all the received TPC commands chosen is the last received TPC command.

9. The method of claim 7, wherein the only one of all the received TPC commands chosen is the first received TPC command.

10. A method implemented in a communication system including a host computer, a base station and a user equipment (UE), the method comprising:
at the host computer, receiving, from the base station, user data originating from a transmission which the base station has received from the UE, wherein the UE performs any of the steps of claim 1.

11. A wireless device for controlling power for an uplink, UL, control channel, the wireless device comprising:
processing circuitry configured to:
receive a first transmit power control, TPC, command;
receive at least a second TPC command;
compute a power for a UL control channel transmission based on at least the first TPC command and the second TPC command; and
determine a power for an UL control channel transmission based on at least the first TPC command, the second TPC command, and a current UL control channel power adjustment state, wherein the at least two TPC commands comprise at least two TPC commands that have an impact on the power for the UL control channel;
a transmitter configured to transmit information via the UL control channel according to the determined power; and
power supply circuitry configured to supply the power to the wireless device.

12. The wireless device of claim 11, wherein the TPC commands were received in a downlink, DL, control information, DCI, message associated with DL data transmissions occurring at different time instants.

13. The wireless device of claim 11, wherein the wireless device operates in a Frequency Division Duplex, FDD, system.

14. The wireless device of claim 12, wherein at least one of the DL data transmissions has a shorter duration than the UL control channel transmission.

15. The wireless device of claim 12, where the DL data transmissions have a same duration as the UL control channel and occur on different frequency carriers.

16. The wireless device of claim 11 wherein being configured to compute the power for the UL control channel transmission based on the first TPC command and the second TPC command comprises being configured to compute the power for the UL control channel transmission as a sum of all received TPC commands associated with the UL control channel.

17. The wireless device of claim 11, wherein being configured to compute the power for the UL control channel transmission based on the first TPC command and the second TPC command comprises being configured to choose only one of all received TPC commands associated with the UL control channel as the computed power.

18. The wireless device of claim 17, wherein the only one of all the received TPC commands chosen is a last received TPC command or a first received TPC command.

* * * * *